(12) United States Patent
Hoss

(10) Patent No.: US 10,518,148 B2
(45) Date of Patent: Dec. 31, 2019

(54) APPARATUS FOR APPLYING GRIPPING TO A TAPERED ELONGATED SHAFT

(71) Applicant: Steven Hoss, Udon Thani (TH)

(72) Inventor: Steven Hoss, Udon Thani (TH)

( * ) Notice: Subject to any disclaimer, the term of this patent is extended or adjusted under 35 U.S.C. 154(b) by 0 days.

(21) Appl. No.: 16/374,532

(22) Filed: Apr. 3, 2019

(65) Prior Publication Data

US 2019/0224542 A1    Jul. 25, 2019

Related U.S. Application Data

(63) Continuation-in-part of application No. 15/494,479, filed on Apr. 22, 2017, now Pat. No. 10,293,227.

(51) Int. Cl.
| | | |
|---|---|---|
| *B23P 11/00* | (2006.01) | |
| *A63B 57/60* | (2015.01) | |
| *F16M 13/02* | (2006.01) | |
| *F16B 7/02* | (2006.01) | |
| *A63B 60/14* | (2015.01) | |
| *A63B 53/14* | (2015.01) | |
| *A63B 60/42* | (2015.01) | |
| *A63B 71/06* | (2006.01) | |

(52) U.S. Cl.
CPC ............... *A63B 57/60* (2015.10); *F16B 7/02* (2013.01); *F16M 13/022* (2013.01); *A63B 53/14* (2013.01); *A63B 60/14* (2015.10); *A63B 60/42* (2015.10); *A63B 2071/0694* (2013.01); *F16M 2200/08* (2013.01)

(58) Field of Classification Search
CPC ............ B23Q 3/00; B23Q 3/06; B23Q 3/154
See application file for complete search history.

(56) References Cited

U.S. PATENT DOCUMENTS

| | | | | |
|---|---|---|---|---|
| 6,886,228 B1 * | 5/2005 | Chen | ..................... | B25B 27/062 29/255 |
| 7,117,769 B2 * | 10/2006 | Somers | ................... | B25B 13/06 81/177.75 |
| 7,125,328 B1 * | 10/2006 | Hacikyan | .................. | B24B 9/10 451/541 |
| 7,478,464 B2 * | 1/2009 | Kang | ..................... | B25B 27/06 29/255 |
| 8,272,628 B2 * | 9/2012 | Winnard | .................. | B25H 3/06 269/6 |

* cited by examiner

*Primary Examiner* — Lee D Wilson

(57) ABSTRACT

An apparatus for aiding the re-gripping golf clubs is presented. In an embodiment, a support base comprises an aperture, wherein the aperture is wider than at least a portion of a tapered elongated shaft and narrower than a second wider portion of the tapered elongated shaft. A slot extends from an end of the support base to the aperture. A user may then slide a golf club through the slot and push down to secure the club in place during re-gripping.

4 Claims, 12 Drawing Sheets

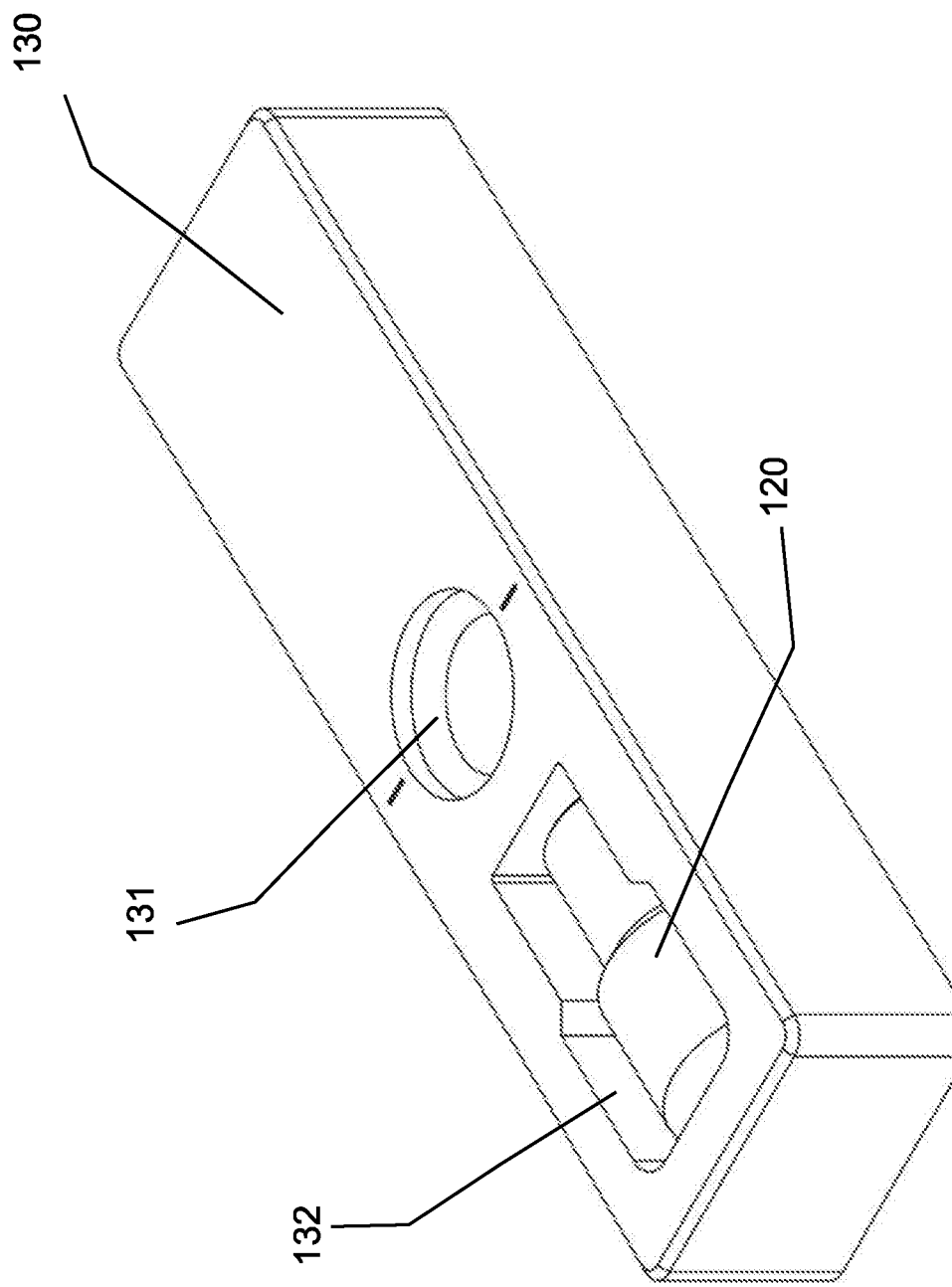

APPARATUS FOR APPLYING GRIPPING TO A TAPERED ELONGATED SHAFT

This application is a continuation-in-part of U.S. application Ser. No. 15/494,479, filed on Apr. 22, 2017, which is herein incorporated by reference in its entirety for all purposes.

TECHNICAL FIELD

This disclosure generally relates to sporting equipment repair.

BACKGROUND

Golf clubs consist of a single tapered elongated tube with a club head on one end and a grip on the other end. Between the grip and the club head is a smooth tapered elongated tube. Conventional golf club grips, which have been in use for more than fifty years, are commonly made from cord, rubber, synthetic blends or various combinations of these materials. With regular play, these grips wear out, get damaged, lose elasticity or become too soft.

When this happens, a golf club needs to be re-gripped. The re-gripping process requires cutting off the old grip with a sharp instrument, cleaning the golf club shaft with solvent, applying two-sided tape to the golf club shaft and finally, as recommended by grip manufacturers, affixing the golf club into a stationary vise and applying a solvent to the tape before slipping the grip over the end of the shaft and applying enough pressure to the grip to force it to seat tightly to the golf club shaft. Once the new grip is in place it must be adjusted to ensure that, if the new grip contains a manufactures logo, it is in alignment with the golf club and that the twist indicators are in alignment before the solvent dries.

This re-gripping process appears to be a daunting task for do-it-yourselfers. For example, virtually of all the golf club grip kits currently on the market come with a black rubber pad that is designed to fit between the jaws of a stationary vise and protect the golf club shaft from damage by the jaws of the stationary vise as the golf club shaft is firmly clamped into the stationary vise during the re-gripping process.

Many golfers do not have access to a workshop or to a stationary vise to hold the golf club steady as the new grip is applied. Therefore, golfers generally resort to having their golf clubs re-gripped by golf equipment professionals, which is usually time consuming and substantially increases the cost of re-gripping their entire set of golf clubs.

SUMMARY OF INVENTION

In particular embodiments, a gripping vise may enable golfers to re-grip their own golf clubs easily and affordably. The gripping vise may be portable and compact enough to use in most rooms of a household (e.g., living room, bedroom, kitchen, bathroom), or outdoors. The gripping vise may comprise two pieces: a gripping collar, and a support base. Both the gripping collar and the support base may be an injection molded polypropylene and/or polycarbonate assembly. The support base may comprise a base and an aperture. The support base may be placed as a bridge between any two stable surfaces of approximately the same height and having enough ground clearance to allow a portion of the golf club to hang underneath. As an example, the two stable surfaces may be two stools, a countertop and a stool, the user's own knees, two tables, or any other suitable surface.

The gripping collar may be made of one or more pieces that may fit around the shaft of a golf club. The gripping collar may also have an outer shell that has a shoulder protruding out from it. At least part of the outer shell may be small enough to fit into the aperture, and at least part of the outer shell (e.g., the shoulder) may be large enough such that a bottom surface of the shoulder rests on a top surface of the support base when at least part of the outer shell is inserted into the aperture. Most golf club shafts are tapered: they have a larger circumference near the gripping end and a smaller circumference near the golf club head. The gripping collar may have a hollow tube that is tapered to fit snugly around the golf club shaft, such that when the golf club shaft is in place in the gripping collar and at least part of the gripping collar is inserted into the aperture of the support base, a downward force may be applied to the golf club, and the support base and gripping collar may resist the downward force, such that the golf club remains fixed. This may allow enough vertical force from above to be applied to the golf club to allow the user to push a replacement grip fully onto the golf club shaft. Once the replacement grip is installed, the gripping collar can be removed from the golf club shaft and the support base can be removed by slipping it over the gripped end of the golf club shaft. The replacement grip can then be adjusted for proper alignment, length and twist and finally be set aside for the solvent to dry which will firmly adhere the replacement grip to the golf club shaft.

In an embodiment, a support base comprises an aperture, wherein the aperture is wider than at least a portion of a tapered elongated shaft and narrower than a second wider portion of the tapered elongated shaft. A slot extends from an end of the support base to the aperture. A user may then slide a golf club through the slot and push down to secure the club in place during re-gripping.

BRIEF DESCRIPTION OF DRAWINGS

FIG. 1 illustrates an example gripping collar stored in an example compartment of an example support base.

DETAILED DESCRIPTION OF INVENTION

Figure 2B:
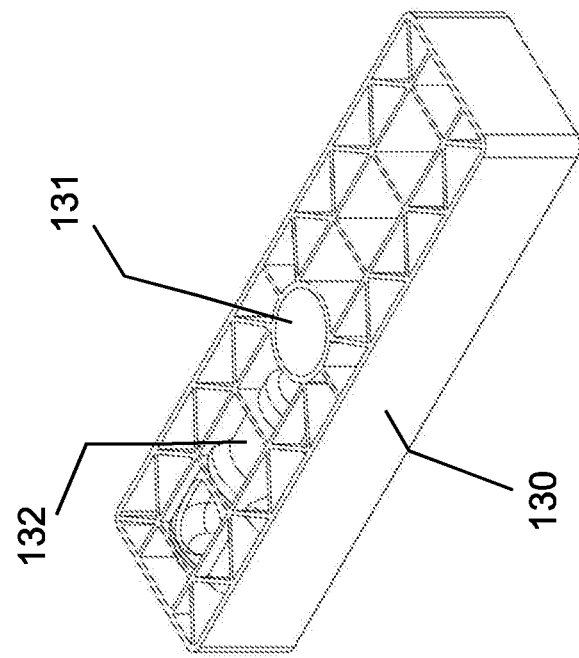
FIG. 2B illustrates another view of the example support base.

In particular embodiments, a gripping vise may enable golfers to re-grip their own golf clubs easily and affordably. The gripping vise may be portable and compact enough to use in most rooms of a household (e.g., living room, bedroom, kitchen, bathroom), or outdoors. The gripping vise may comprise two pieces: a gripping collar, and a support base. Both the gripping collar and the support base may be an injection molded polypropylene and/or polycarbonate assembly. The support base may comprise a base and an aperture. The support base may be placed as a bridge between any two stable surfaces of approximately the same height and having enough ground clearance to allow a portion of the golf club to hang underneath. As an example, the two stable surfaces may be two stools, a countertop and a stool, the user's own knees, two tables, or any other suitable surface.

The gripping collar may be made of one or more pieces that may fit around the shaft of a golf club. The gripping collar may also have an outer shell that has a shoulder protruding out from it. At least part of the outer shell may be small enough to fit into the aperture, and at least part of the outer shell (e.g., the shoulder) may be large enough such that a bottom surface of the shoulder rests on a top surface of the support base when at least part of the outer shell is inserted into the aperture. Most golf club shafts are tapered: they have a larger circumference near the gripping end and a smaller circumference near the golf club head. The gripping collar may have a hollow tube that is tapered to fit snugly around the golf club shaft, such that when the golf club shaft is in place in the gripping collar and at least part of the gripping collar is inserted into the aperture of the support base, a downward force may be applied to the golf club, and the support base and gripping collar may resist the downward force, such that the golf club remains fixed. This may allow enough vertical force from above to be applied to the golf club to allow the user to push a replacement grip fully onto the golf club shaft. Once the replacement grip is installed, the gripping collar can be removed from the golf club shaft and the support base can removed by slipping it over the gripped end of the golf club shaft. The replacement grip can then be adjusted for proper alignment, length and twist and finally be set aside for the solvent to dry which will firmly adhere the replacement grip to the golf club shaft.

In particular embodiments, a gripping collar may comprise an outer shell, a shoulder that protrudes from the outer shell, and a receiving area, wherein the gripping collar is operable to receive an elongated shaft at the receiving area. In particular embodiments a support base may comprise an aperture, wherein the aperture is wider than at least a portion of the outer shell of the gripping collar and narrower than an outer edge of the shoulder of the gripping collar.

FIG. 1 illustrates an example gripping collar 120 stored in an example compartment 132 of an example support base 130. The support base 130 may include an aperture 131 through which at least a portion of the gripping collar 120 may be inserted. In particular embodiments, the aperture 131 may be a simple hole in a top portion of the support base 130, or the aperture 131 may have a tiered wall structure, similar to that shown in FIG. 1. A tiered wall structure may provide extra stability to the gripping collar 120 when it is inserted into the aperture 131. Although a particular gripping collar 120 and support base 130 are shown and discussed in this disclosure, this disclosure contemplates any suitable type of gripping collar and support base, having any suitable structure or dimensions. As an example, this disclosure contemplates support bases of various sizes and shapes, such as circular, elliptical, etc. As another example, this disclosure contemplates gripping collars of various sizes and shapes, such as rectangular, as will be discussed below.

Figure 2A:
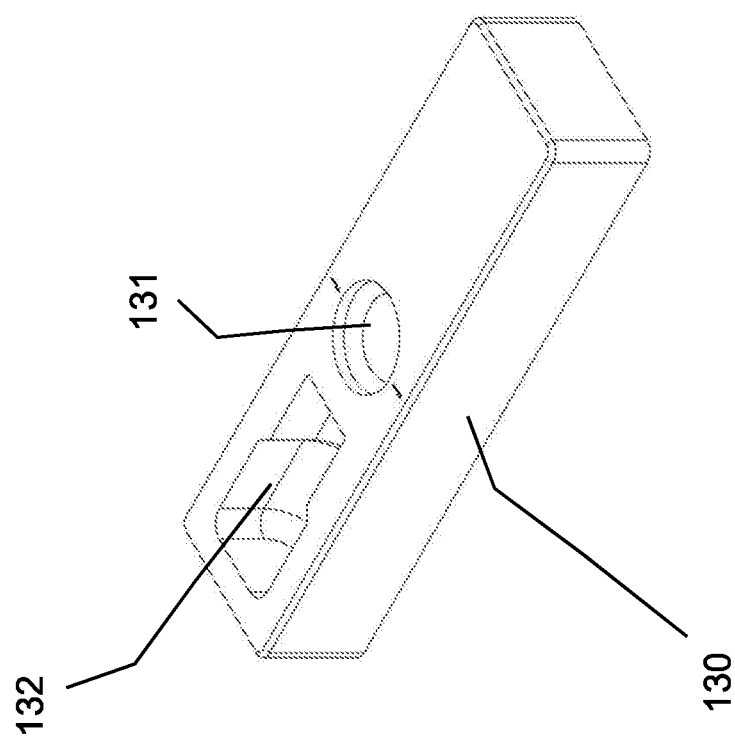
FIG. 2A illustrates an example support base.

FIGS. 2A and 2B illustrate an example support base 130. The support base 130 may include an aperture 131 through which at least a portion of the gripping collar 120 may be inserted. In particular embodiments, the aperture 131 may be a simple hole in a top portion of the support base 130, or the aperture 131 may have a tiered wall structure, similar to that shown in FIG. 1. The aperture 131 shown in FIG. 1 has a single tier (e.g., the aperture 131 may have a top level which may be on the same plane as the top surface of the support base 130 and a second level which is below the top surface of the support base 130). In particular embodiments, aperture 131 may have two or more tiers (e.g., the aperture 131 may have a third level which is below the second level of the aperture discussed above). A tiered wall structure may provide extra stability to the gripping collar 120 when it is inserted into the aperture 131. In particular embodiments, the wall of the aperture 131 may be longer (e.g., three inches long), to add more stability for the gripping collar. In particular embodiments, the aperture 131 may have screw threads, such that the gripping collar may be screwed into place within the aperture 131 of the support base 130. Although a particular support base 130 is shown and discussed in this disclosure, this disclosure contemplates any suitable type of gripping collar and support base, having any suitable structure or dimensions. As an example, this disclosure contemplates support bases of various sizes and shapes, such as circular, elliptical, etc.

Figure 3B:
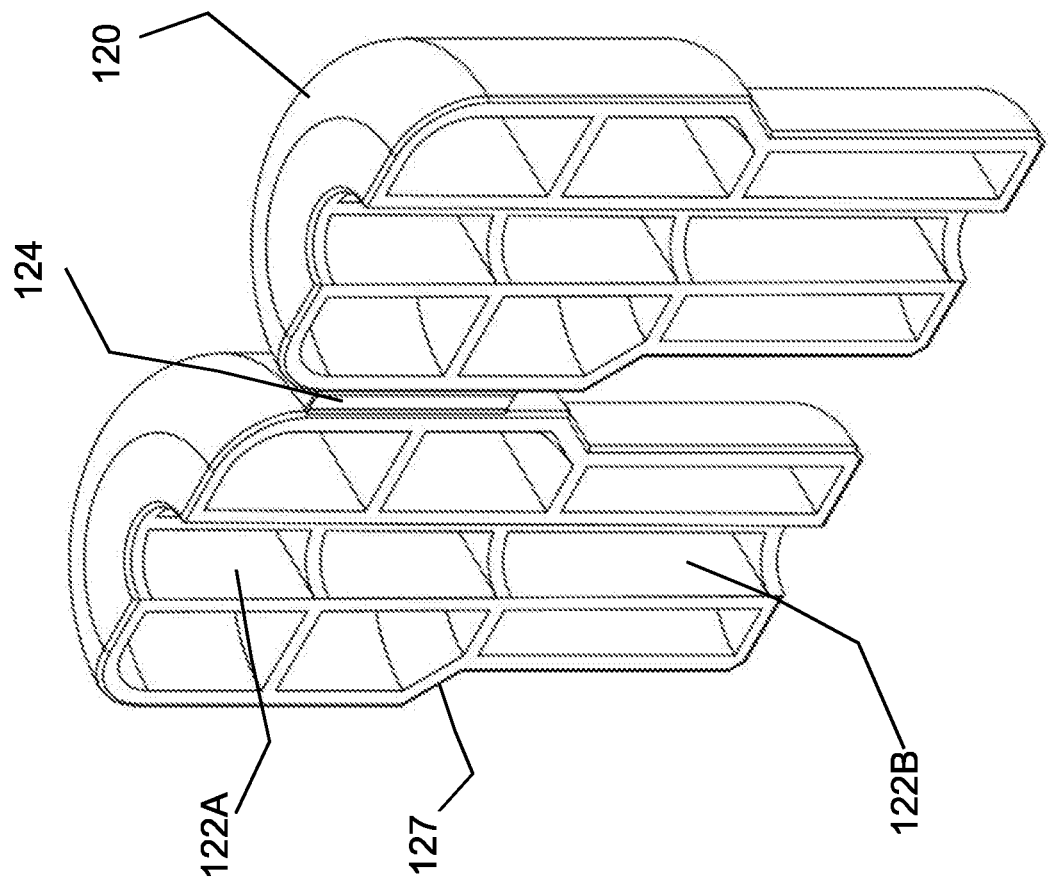
FIG. 3B illustrates another view of the example gripping collar.
Figure 3A:
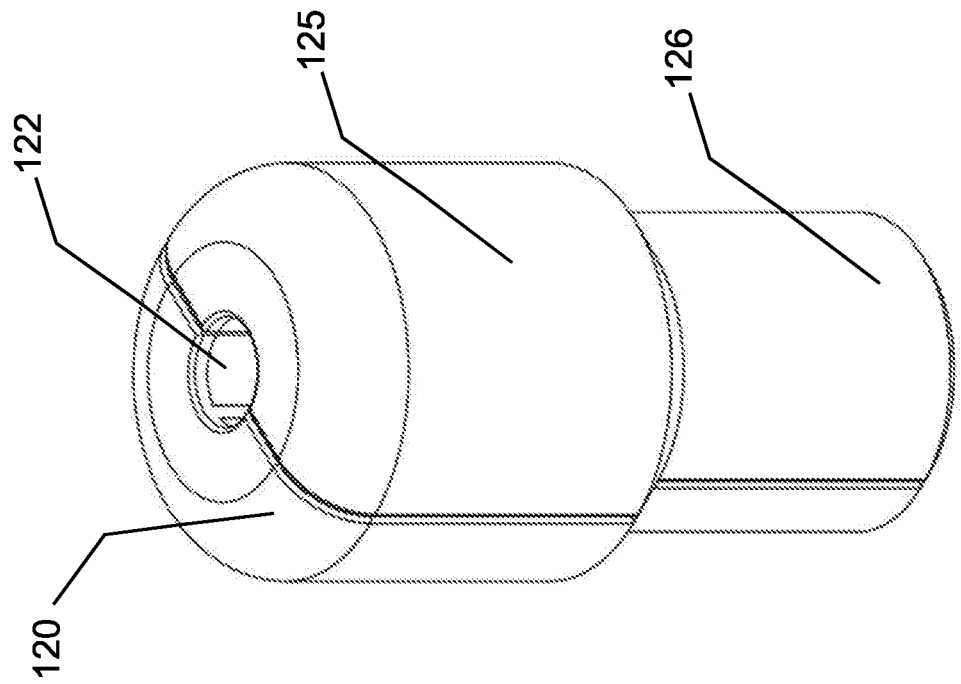
FIG. 3A illustrates an example gripping collar.

FIGS. 3A and 3B illustrate an example gripping collar 120. The gripping collar 120 may comprise an outer shell, which may be made of an upper portion 125 and a lower portion 126. The gripping collar 120 may further comprise a receiving area 122, a shoulder 127, and a hinge 124. In particular embodiments, the upper portion 125 may be cylindrical and may have a circumference that is larger than the lower portion 126. In particular embodiments, the upper portion may be rectangular, or may be any other suitable shape. In particular embodiments, the upper portion may have a circumference (e.g., if cylindrical) that is the same as or smaller than the lower portion 126. In particular embodiments, the shoulder 127 may protrude (e.g., extend) away from the outer shell at a tapered angle or at a right angle. In particular embodiments, the shoulder may be a lip or a flange. In particular embodiments, the shoulder 127 may extend far enough out from the lower portion 126 of the outer shell so that it rests on a top surface of the support base 130. This top surface may be the actual top surface of support base 130, or may be a top surface within the aperture 131, as shown in FIGS. 1, 2A, and 2B. The receiving area 122 of the gripping collar 120 may comprise a hollow tube or tube-like structure, which may be designed to receive the shaft of a golf club. This disclosure describes a particular gripping collar 120 and support base 130, but this disclosure contemplates any suitable gripping collar or support base, such as a gripping collar and support base that are rectangular in shape instead of cylindrical, or vice versa.

In particular embodiments, the receiving area 122 may be tapered to mimic the taper of the shaft of a golf club. The receiving area 122 may have a top end 122A and a bottom end 122B. Each of these ends may have a circumference, and the circumference of the top end 122A may be larger than the circumference of the bottom end 122B. In particular embodiments, the gripping collar 120 may be divided into two pieces and connected by a hinge 124. The hinge 124 may be made of the same material as the gripping collar 120 or may be made of any suitable material. The hinge 124 may consist of a single piece of material or may consist of multiple pieces of material. Any suitable hinge is contemplated by this disclosure. The receiving area 122 may receive the shaft of a golf club by means of the two pieces of the gripping collar 120 and the hinge 124. The shaft of the golf club may be placed in the receiving area 122 when the gripping collar is open, as is shown in FIG. 3B. When the shaft of the golf club is in place, the gripping collar 122 may be closed around the shaft to "lock" it in place. To be locked in place may mean that when the gripping collar 120 is closed, the golf club cannot move down in relation to the gripping collar. When the gripping collar is inserted into the aperture 131, the tapered receiving area 122, in combination with the shoulder 127, may allow a downward force to be applied to the golf club without the golf club slipping down inside the gripping collar. This disclosure describes a particular gripping collar 120, but this disclosure contemplates any suitable gripping collar, such as a gripping collar that is rectangular in shape instead of cylindrical. As another example, the gripping collar may function equally as well with an upper portion that has the same width as the lower portion, so long as a shoulder, lip, flange, or other suitable protrusion acts to prevent the entire gripping collar from sliding through an aperture in the support base.

Figure 4:
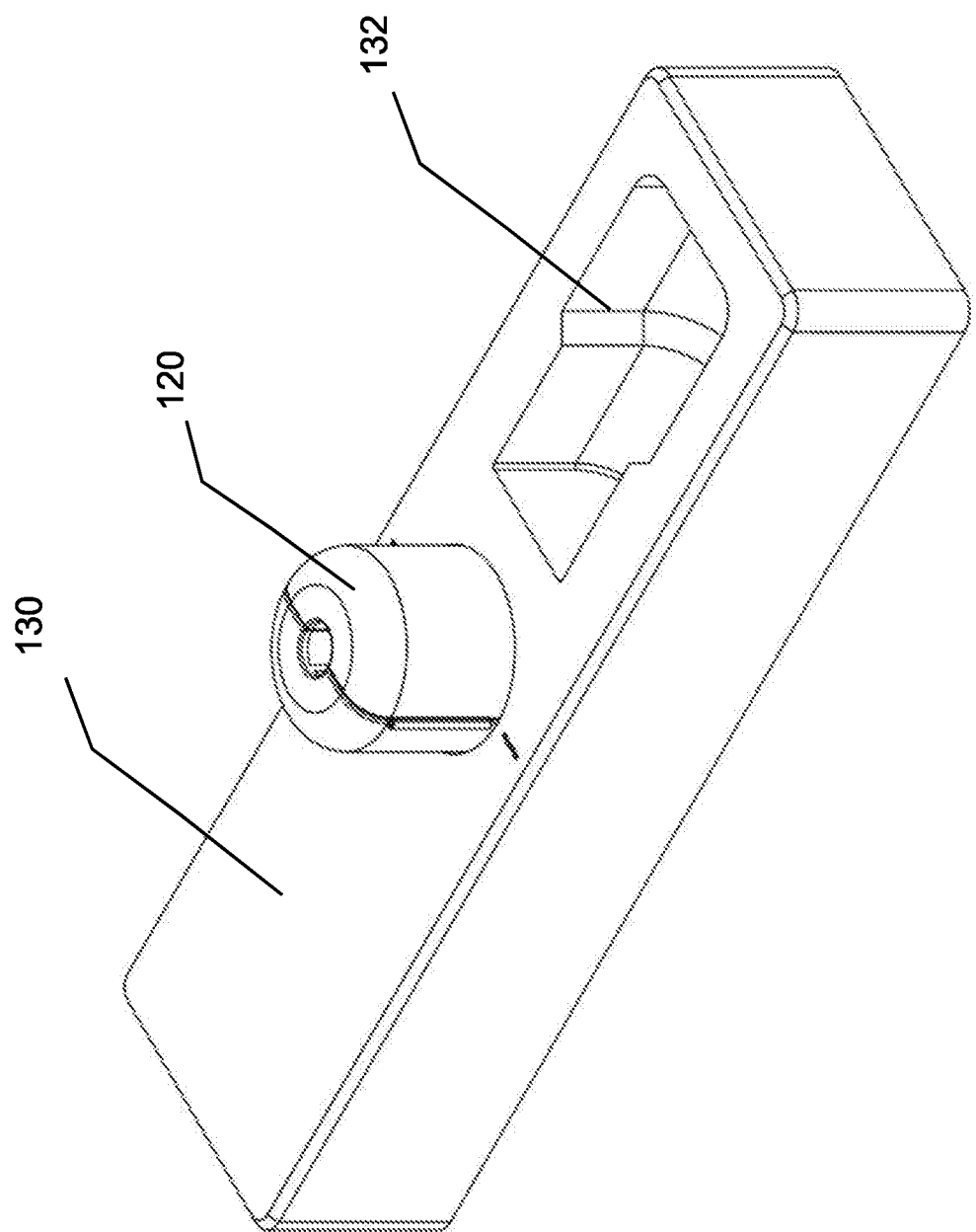
FIG. 4 illustrates an example gripping collar at least part of which is inserted into an example aperture of an example support base.

FIG. 4 illustrates an example gripping collar at least part of which is inserted into an example aperture of an example support base. In this illustration, the bottom portion 126 of the outer shell of the gripping collar may be below the top surface of the support base 130. Additionally, the shoulder 127 may be resting on top of a top surface of the support base 130, which may be the uppermost surface of support base 130, or may be a top surface within the aperture 131, as shown in FIGS. 1, 2A, and 2B. In particular embodiments, the gripping collar 120 may be screwed into the support base 130 by means of screw threads. In particular embodiments, the support base 130 may include a compartment 132 for storing the gripping collar 120 when the gripping vise is not in use. Although a particular gripping collar 120 and support base 130 are shown and discussed in this disclosure, this disclosure contemplates any suitable type of gripping collar and support base, having any suitable structure or dimensions. As an example, this disclosure contemplates support bases and gripping collars of various sizes and shapes, such as circular, elliptical, rectangular, and so on.

Figure 5:
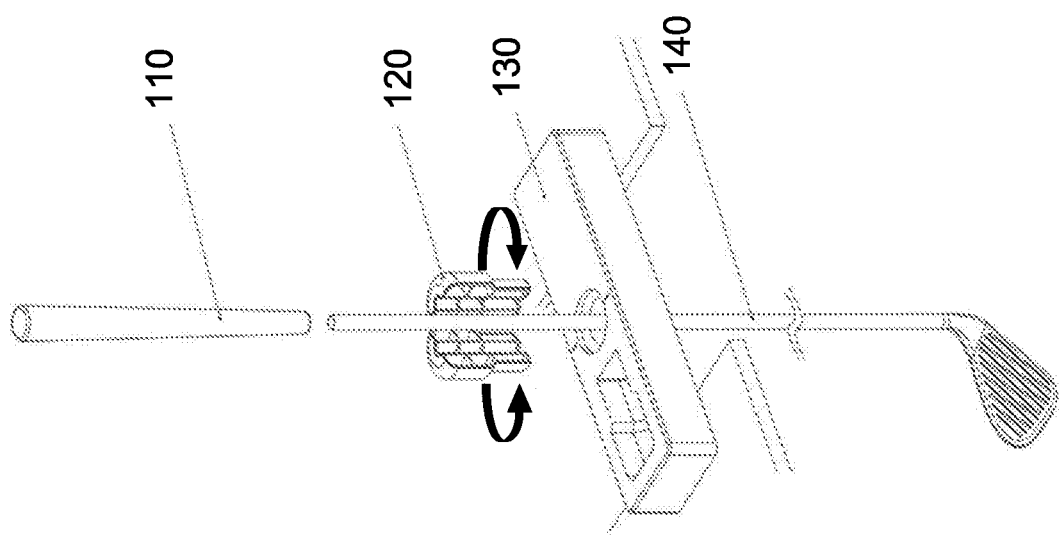
FIG. 5 illustrates an example assembly for an example gripping collar, example support base, and example golf club.

FIG. 5 illustrates an example assembly for an example gripping collar, example support base, and example golf club. In the example assembly of FIG. 5, the gripping collar 120 is illustrated as being in the open position, ready to receive the shaft of the golf club 140. The golf club has a golf club grip 110, which is not yet affixed to the shaft of golf club 140. The support base may be positioned between two sturdy or semi-sturdy structures, such as two tables, stools, or the like. The arrows surrounding the gripping collar 120 show how the two sides of the gripping collar 120 enclose around the shaft of the golf club 140. Although this disclosure describes the gripping vise in a particular manner, this disclosure contemplates any suitable gripping vise.

Figure 6:
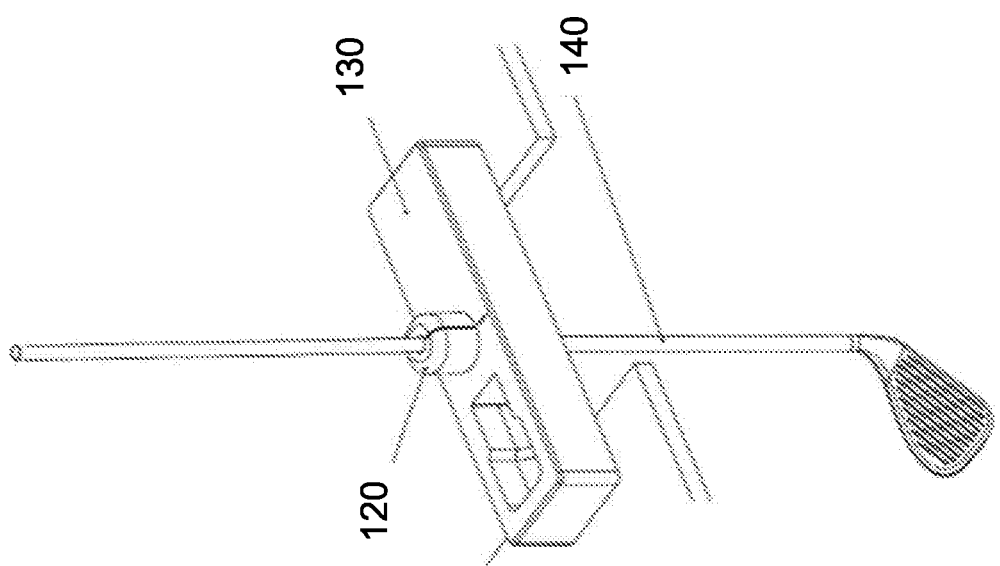
FIG. 6 illustrates another example assembly for an example gripping collar, example support base, and example golf club.

FIG. 6 illustrates another example assembly for an example gripping collar, example support base, and example golf club. In this example illustration, the gripping collar 120 fully encloses the golf club 140, and a portion of the gripping collar 120 is inserted into the aperture 131 (not labeled) of support base 130. Although not expressly illustrated in FIG. 6, it may be appreciated by those skilled in the art that the shoulder 127 of the gripping collar 120 is adjacent to a surface of the support base 130 or the aperture 131 such that the shoulder 127 prevents the gripping collar 120 from sliding all the way through the aperture 131. In particular embodiments, the shaft of the golf club 140 may be tapered, with the circumference of the shaft becoming increasingly smaller from the top of the golf club down to the head of the golf club. Thus, the portion of the shaft nearest the head of the golf club 140 may have a smaller circumference than the portion of the shaft nearer to the top of the golf club 140 (e.g., where the grip 110 will be installed). The receiving area 122 of the gripping collar may be similarly tapered such that the golf club shaft may be incapable of sliding down the receiving portion 122 of the gripping collar 120 past a particular point. Although this disclosure describes the gripping vise in a particular manner, this disclosure contemplates any suitable gripping vise.

Figure 7:
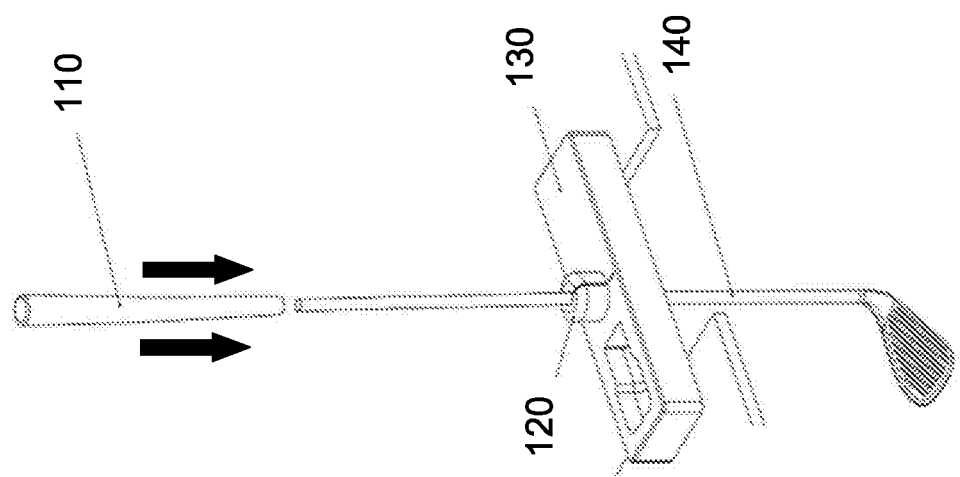
FIG. 7 illustrates another example assembly for an example gripping collar, example support base, and example golf club.

FIG. 7 illustrates another example assembly for an example gripping collar, example support base, and example golf club. At this point in the assembly, the golf club grip 110 may be ready to be installed on the golf club 140. In particular embodiments, adhesive may be applied to the top of the golf club so that the golf club grip 110 may adhere to the golf club 140. In particular embodiments a solvent substance may be applied that first acts as a lubricant while the golf club grip 110 is being pushed down onto the golf club 140 and, once the golf club grip 110 is in place on the golf club 140, "sets" or the solvent dries to become an adhesive and ensures that the golf club grip 110 remains fixed to the golf club 140. As discussed above, the receiving area 122 of the gripping collar may be tapered such that the top of the receiving area 122 (e.g., top end 122A) is larger than the bottom of the receiving area (e.g., bottom end 122B). This may have the effect of ensuring that when a downward force is applied to the golf club grip 110 and in turn the golf club 140, the golf club shaft may be incapable of sliding down the receiving area 122 of the gripping collar 120 past a particular point. This may allow for a secure and full installation of the golf club grip 110. Although this disclosure describes the gripping vise in a particular manner, this disclosure contemplates any suitable gripping vise.

Figure 8:
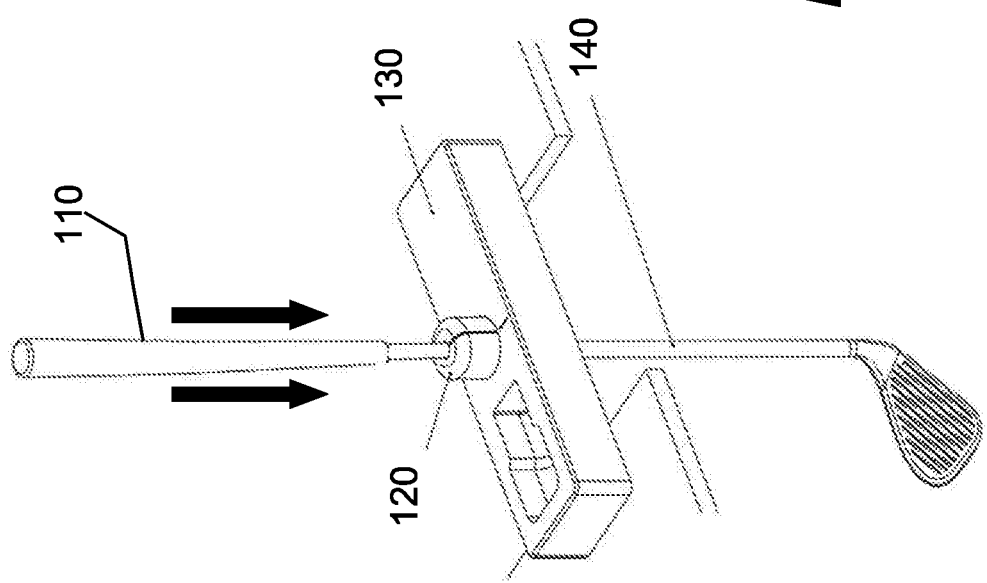
FIG. 8 illustrates another example assembly for an example gripping collar, example support base, and example golf club.

FIG. 8 illustrates another example assembly for an example gripping collar, example support base, and example golf club. At this point in the assembly, the golf club grip 110 may be fully installed onto the golf club 140. Once the golf club grip 110 is fully installed (e.g., it cannot be pushed down farther onto the golf club 140), the user may make small adjustments to the orientation of the golf club grip 110 by twisting the golf club grip 110 to the left or to the right as he or she so desires. Then the user may allow the solvent to dry and make a complete adhesion between the golf club grip 110 and the golf club 140. Although this disclosure describes the gripping vise in a particular manner, this disclosure contemplates any suitable gripping vise.

Figure 9:
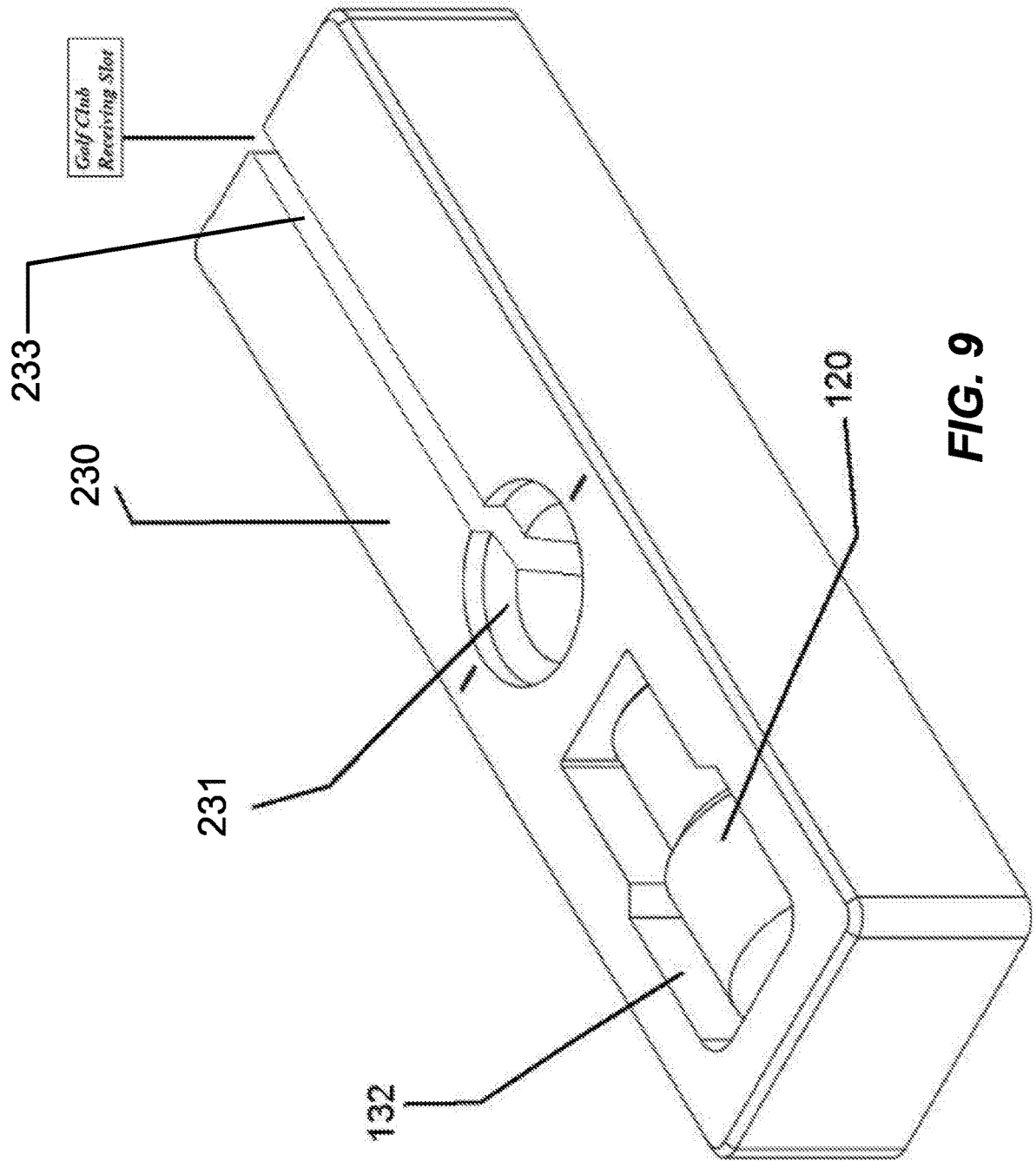
FIG. 9 illustrates an example of a gripping vise support base including a receiving slot.

FIG. 9 illustrates another example embodiment of a gripping vise support base. In this example, a support base 230 includes a receiving slot 233. Slot 233 may comprise an opening from one end of the base 230 to aperture 231. Support base 230 may be used to apply a golf club grip similarly to base 130. Slot opening 233 may allow a user to slide a golf club shaft from the side and into the aperture 231, instead of having to insert the club from the bottom of the aperture. Gripping vise 120 may then be closed around the shaft and pushed down for stabilization during gripping. Slot opening 233 prove beneficial in cramped working spaces where turning the golf club may be difficult, allowing users to maintain the club's orientation and simply slide it from the side. As shown in the example of FIG. 9, slot 233 may have a smaller width than aperture 231. As with particular prior embodiments, support base 230 may further include a gripping vise 120 and a compartment 132 for storing the gripping vise.

Figure 10:
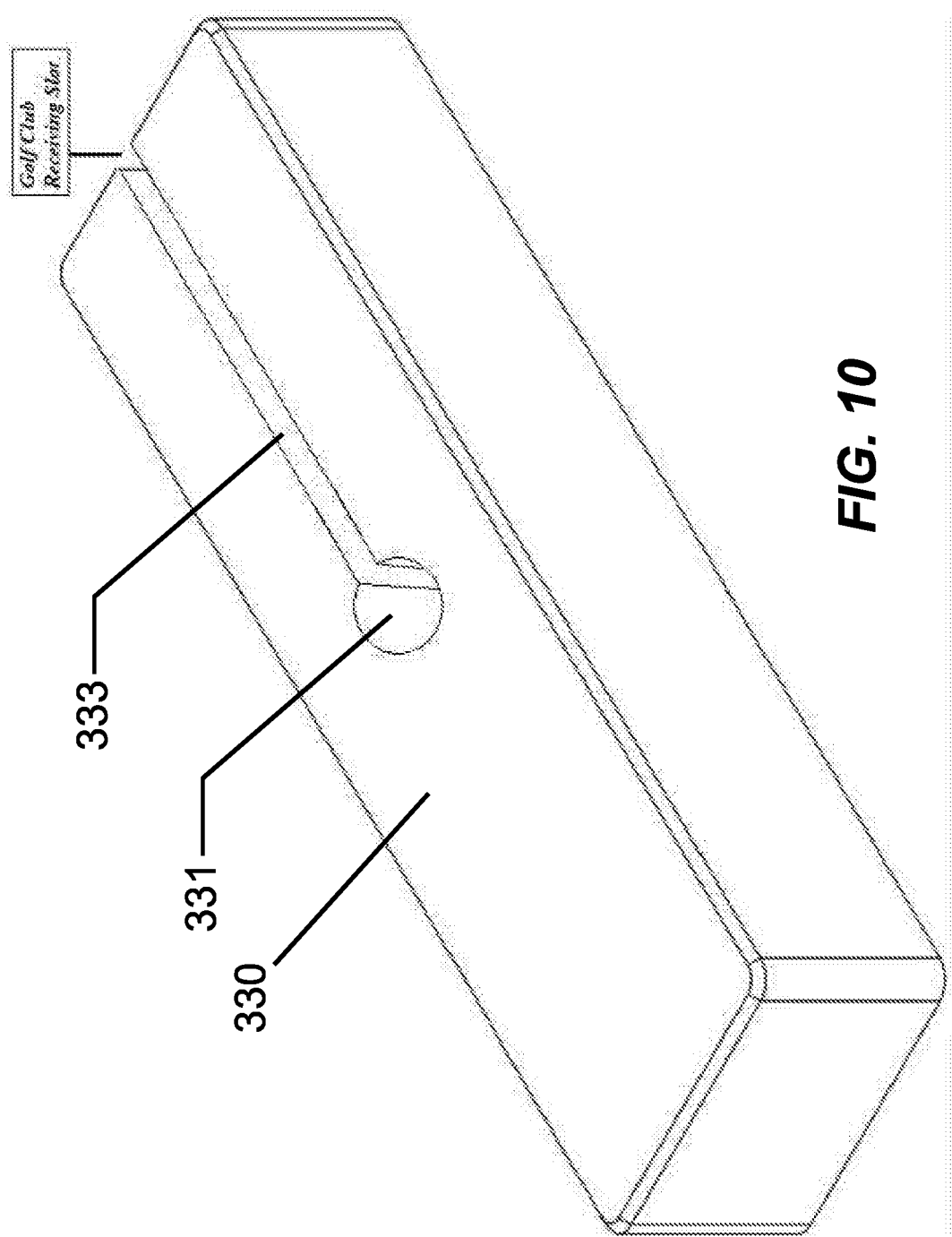
FIG. 10 illustrates an example of a gripping vise support base for directly receiving a tapered shaft.

FIG. 10 illustrates another example embodiment of a gripping vise support base. In this example, a support base 330 has an aperture 331 configured to directly receive a golf club shaft. Due to the tapered nature of typical golf clubs, an aperture 331 may be sized to match the thickness of the shaft at point a below the grip area.

Figure 11:
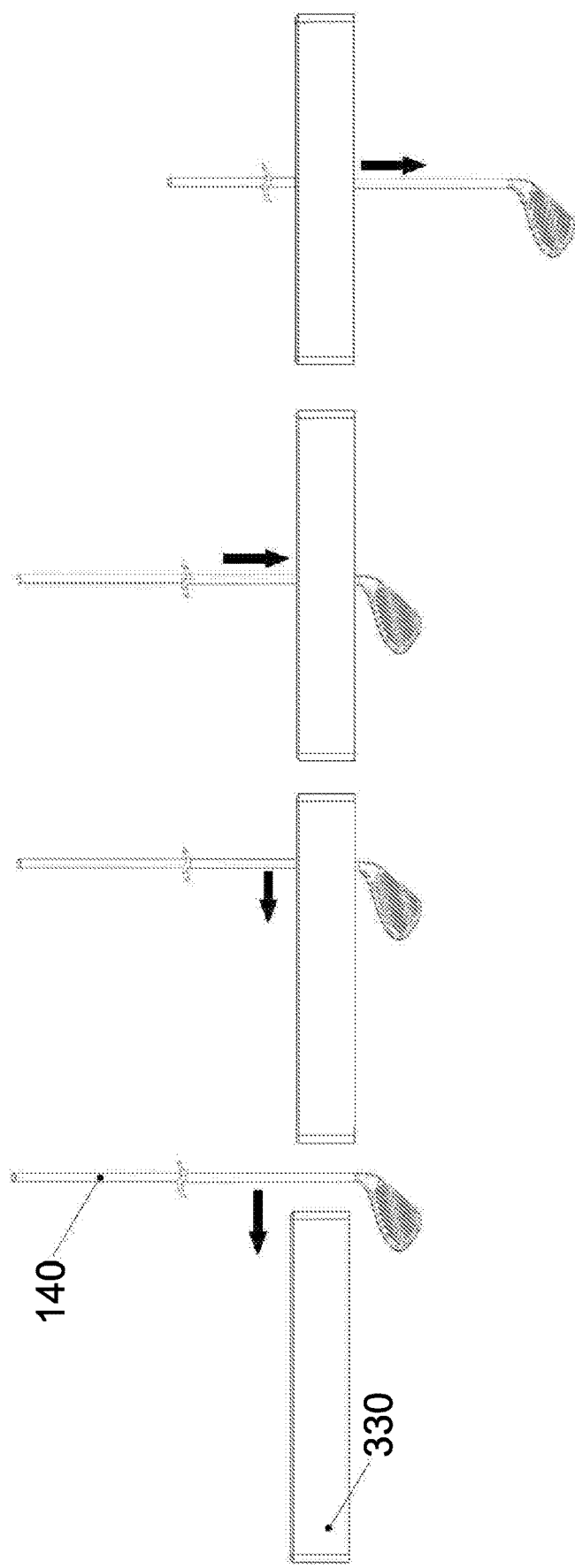
FIG. 11 illustrates steps of using gripping vise support base having a receiving slot and aperture for directly receiving a tapered shaft.

Support base 330 further includes a receiving slot 333 for inserting the club from the side, as explained above with reference to FIG. 9. A user may thus slide the club along a lower and thinner end of the shaft through slot 333 and into aperture 331, then push down to stabilize the shaft in place at a thicker portion of the shaft. Support base 330 thus eliminates the need for a gripping collar, as the club can be inserted directly into aperture 331 and be held in place. FIG. 11 illustrates the steps of using gripping vise support base 330.

The support bases described throughout this disclosure may be made of any suitable material, such as, by way of example, metal, plastic, wood, etc. In particular embodiments, support bases 230 and 330 may be made of a plastic material that facilitates a slight separation of the ends of the slot 233 or 333, so as to facilitate sliding a tapered shaft through the slot.

Figure 12:
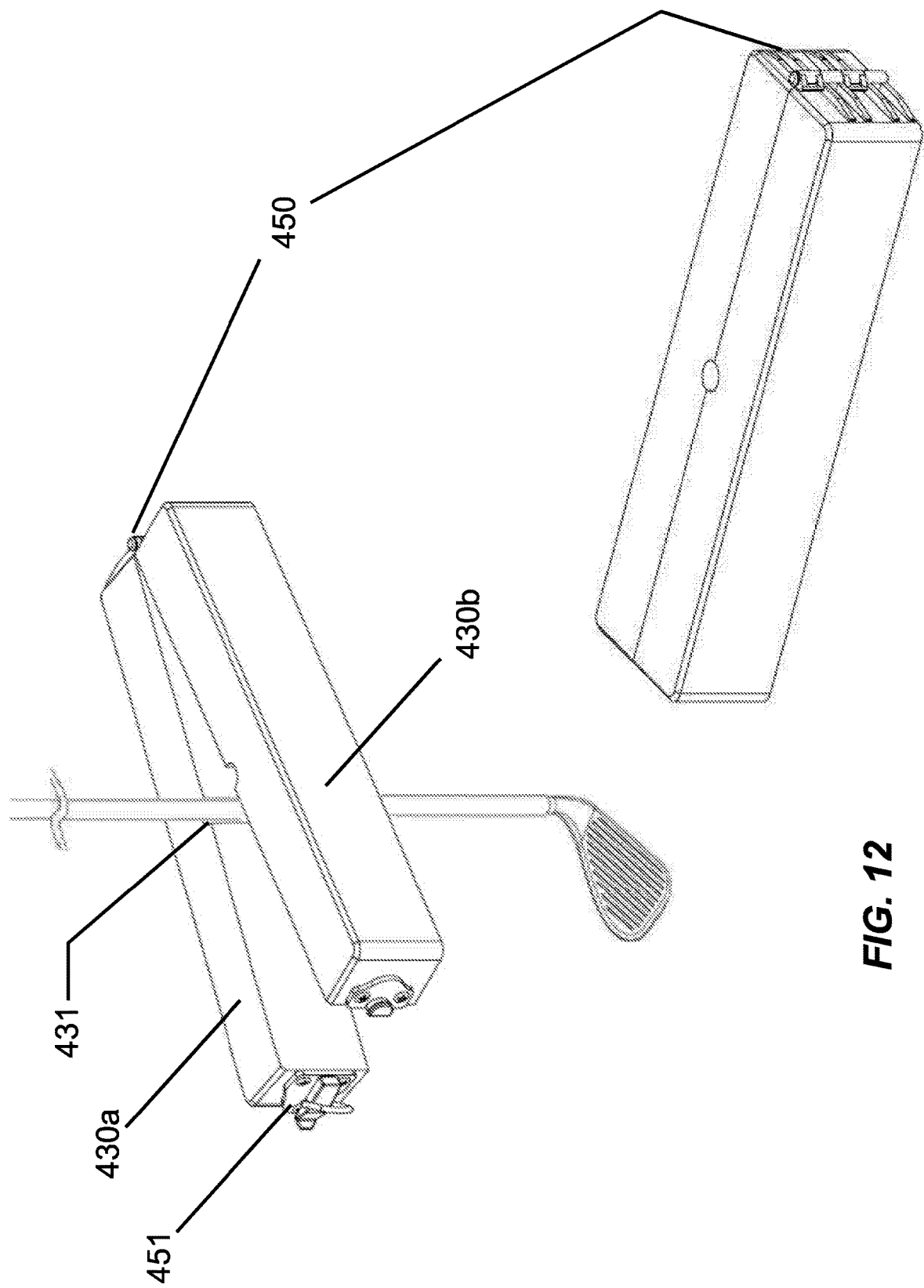
FIG. 12 illustrates an example of a gripping vise support base comprised of two pieces.

FIG. 12 illustrates another example embodiment of a gripping vise support base. In this example, a support base is comprised of two pieces 430a and 430b. Pieces 430a and 430b are joined together to form a support base with an aperture 431 for stabilizing a golf club. Support base removes the need to insert the golf club through an aperture or a sliding slot as with prior embodiments. Instead, the user may separate the pieces 430a and 430b and close them around the golf club shaft, as shown in FIG. 12. Support base pieces 430a and 430 may be joined together by any suitable coupling mechanism. In particular embodiments, one end of the pieces is joined together by a hinge 450 and the other by a clasp 451. A user may unlock clasp 451 to open the support base and place a golf club, while pieces 430a and 430b remain connected by means of the hinge 450. The club may thus be placed directly into the aperture and the support base closed around it. If needed the user may then push down on the club to stabilize it and performing gripping, as with prior embodiments.

What is claimed is:

1. A support base for stabilizing a golf club while re-gripping, the support base comprising:
    an aperture forming a tapered hole traversing through a height of the support base, wherein the tapered hole has a larger diameter at the top of the support base and a smaller diameter at the bottom of the support base and wherein the aperture is wider than a most narrow portion of a tapered elongated shaft, and
    a slot forming an elongated channel traversing the height of the support base, wherein the slot is narrower than a diameter of the aperture and extends from an end of the support base to the aperture.

2. The system of claim 1, wherein the support base is made of a plastic material.

3. A support base for stabilizing a golf club while re-gripping, the support base comprising:
    a first segment forming a first half of the support base, the first segment including a first indentation; and
    a second segment forming a second half of the support base, the second segment including a second indentation,
    wherein the first and second segments are joined by a coupling mechanism, the coupling mechanism comprising:
        a hinge joining the first and second segments of the support base, and
        a closing mechanism for securing the first and second segments in a locked position;
    wherein at a closed position the first and second segments create an aperture forming a tapered hole traversing through a height of the support base, wherein the tapered hole has a larger diameter at the top of the support base and a smaller diameter at the bottom of the support base and wherein the aperture is wider than a most narrow portion of a tapered elongated shaft.

4. The support base of claim 3, wherein the closing mechanism comprises a clasp.

* * * * *